(No Model.)
J. J. BARRON.
COTTON CHOPPER.
No. 445,461. Patented Jan. 27, 1891.
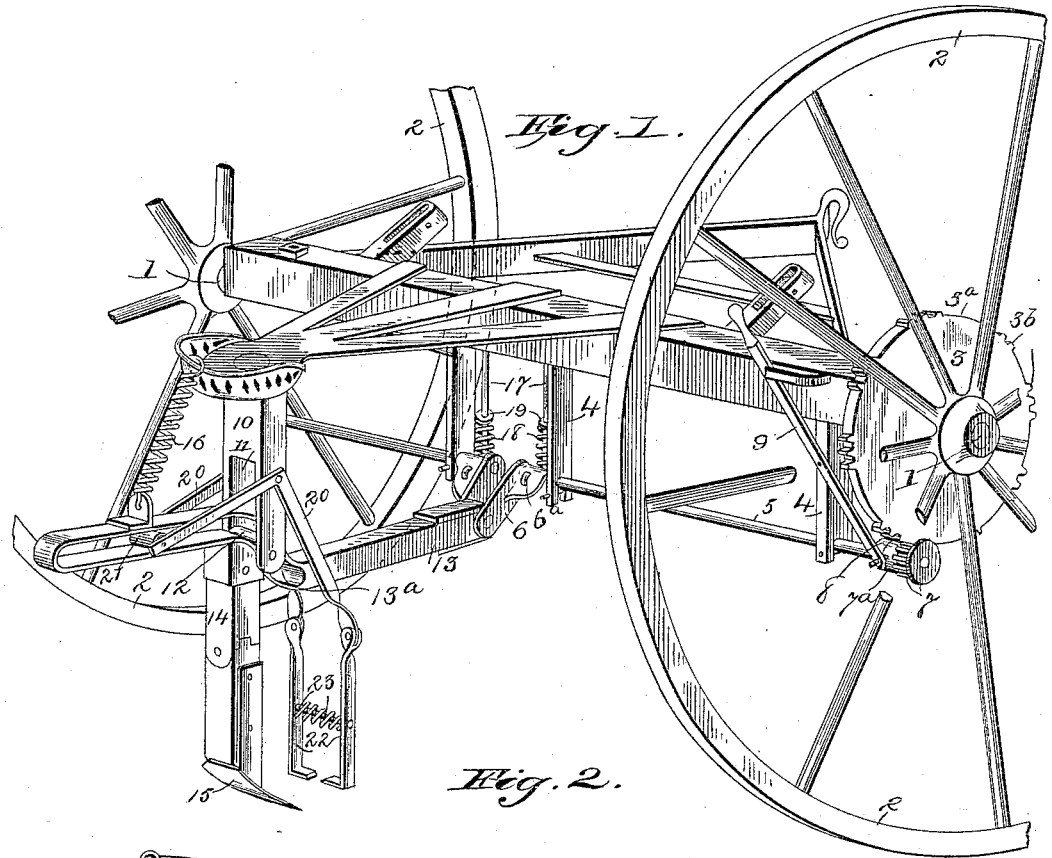
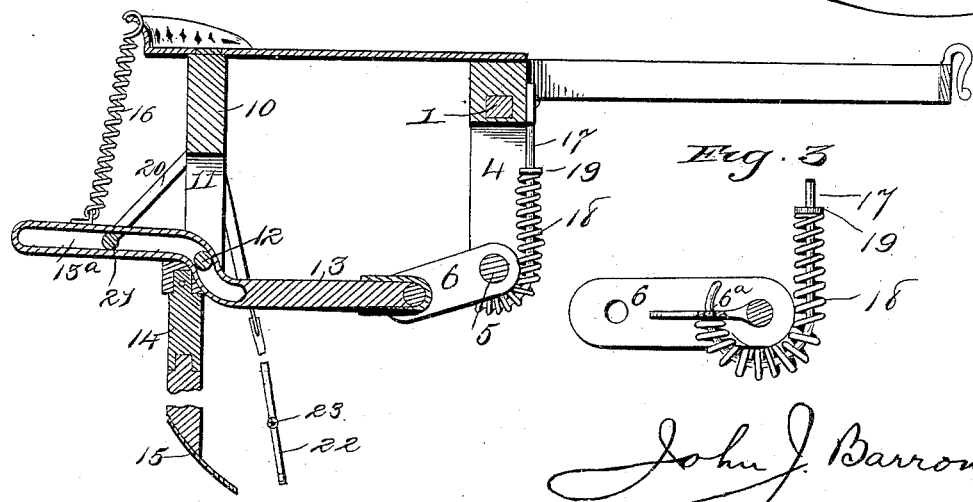
WITNESSES
A. J. Schwartz
J. F. Reily
John J. Barron,
INVENTOR:
By W. J. Fitzgerald & Co.,
Attorneys.

UNITED STATES PATENT OFFICE.

JOHN J. BARRON, OF VALMONT, COLORADO.

COTTON-CHOPPER.

SPECIFICATION forming part of Letters Patent No. 445,461, dated January 27, 1891.

Application filed September 24, 1890. Serial No. 366,016. (No model.)

*To all whom it may concern:*

Be it known that I, JOHN J. BARRON, a citizen of the United States, residing at Valmont, in the county of Boulder and State of Colorado, have invented certain new and useful Improvements in Cotton-Choppers; and I do hereby declare the following to be a full, clear, and exact description of the invention, such as will enable others skilled in the art to which it appertains to make and use the same.

My invention consists in a new and improved cotton-chopper, which can be readily secured or attached to any riding-cultivator, and which is exceedingly thorough and effective in its operation; and my invention will be hereinafter fully described and claimed.

Referring to the accompanying drawings, Figure 1 is a perspective rear view of my invention. Fig. 2 is a sectional detail view taken on line *a a*, and Fig. 3 is a detail view of the auxiliary side hoes.

The same numerals of reference indicate corresponding parts in all the figures.

Referring to the several parts by their designating-numerals, 1 indicates the axle, upon the ends of which the main supporting-wheels 2 are mounted and revolve.

To the inner side of the right-hand wheel is bolted or secured by screws a large mutilated gear-wheel 3—that is, a wheel having blank spaces $3^a$ formed on its periphery between groups of teeth $3^b$, as shown. Below the axle 1 is supported, in hangers 4, a crank-shaft 5, formed with a central crank 6. Upon the end of the crank-shaft is loosely mounted a pinion 7, which meshes with the teeth of the mutilated gear-wheel, and which has a clutch $7^a$ on the inner end of its collar, while a clutch-sleeve 8 slides upon a feather on the same end of the crank-shaft and is thrown into and out of gear by a lever 9.

From the rear end of the seat-frame projects downward a pillar 10, formed with a vertical slot 11, and in the lower end of this slotted end is pivoted a roller 12.

On the crank-pin of the shaft 5 is pivoted the forward end of beam 13, which extends back and is then curved upward and back somewhat in the shape of the letter S, and the curved rear part of this beam is formed with the curved slot $13^a$. The rear slotted part of the beam slides in the slotted pillar 10, the roller 12 running in the slot $13^a$.

From the rear part of the beam 13 projects downward a standard 14, carrying at its lower end the cutting-blade 15, and this standard is pivoted at its center, as shown, so that its lower end, with the blade, can be inclined to either side to keep the blade always at the center of the row. The upper rear end of the beam 13 is connected by a spiral spring 16 with the seat-frame.

To the front of the square axle 1, at its middle, are secured the upper ends of two vertical rods 17 17, the lower ends of which curve around under and back of the crank-shaft 5, their ends passing through apertures $6^a$ at the base of the flattened side pieces of the crank 6. On the lower part of these hooked rods 17 are arranged spiral springs 18, the lower ends of which bear against the flattened side pieces of the crank 6, while their upper ends bear against fixed disks 19 on the rods 17.

To the sides of the pillar 10 are centrally pivoted light L-shaped levers 20, between the upper ends of which is journaled a roller 21, which runs in the rear part of the slotted beam 13. To the lower ends of these levers are pivoted the upper ends of clearing-hoes 22 22, which are pivotally mounted near their centers on a transverse rod 23, having a spiral spring 24 mounted on it between the two hoes, and the lower ends or blades of these hoes extend in toward each other, as shown.

In operation, the clutch-collar 8 having been engaged with the clutch-pinion 7, as the right-hand wheel revolves it revolves with it the mutilated gear-wheel 3, and as each group of teeth of said wheel reaches the pinion 7 it turns the crank-shaft 5, turning its crank forward and downward. The crank-shaft pulls the beam 13 by its forward end forward and downward, and as the peculiarly-curved slotted end of the beam slides on the roller 12 in the lower end of the slotted pillar 10 the rear part of the beam and with it the standard 14 and the cutting-blade 15 are swung quickly forward and downward until the blade reaches the position shown in dotted lines in Fig. 2. As soon as the teeth of that group on the gear-wheel 3 pass the pinion 7 the coiled springs 18 18 on the hooked rods 17 17 swing the crank around to its normal position, raising with it the forward end of the beam 13, while the spring 16 at the same instant raises the rear end of the beam 13 to its normal position. It will thus be seen that as each group of teeth on the mutilated gear-wheel 3 reaches the pinion 7 the cutting-blade 15 will be moved forward and downward to chop the cotton, and will be instantly raised again by the peculiarly-arranged springs as each group of teeth passes the pinion 7. It will further be seen that by my new and novel construction a peculiarly-effective stroke or movement is given to the cutting-blade, this being obtained, mainly, by the peculiar form of the slotted beam 13, running on the fixed roller 12, and the manner in which this beam is drawn forward and downward at its front end by the crank-shaft. The side hoes 22 serve to clear the sides of the row or bill, and it will be seen that as the cutting-blade 15 is swung forward and downward the rear slotted end of beam 13, acting on the roller 21, journaled between the rear ends of the levers 20, swings the side hoes up out of the way as the blade 15 descends, while as the cutting-blade rises the slotted end of the beam raises the rear ends of the levers 20 and lowers the side hoes into their operative position.

Having thus described my invention, what I claim, and desire to secure by Letters Patent, is—

1. In a cotton-chopper, the combination of the crank-shaft, means for turning the same, the recessed pillar 10, having the guide-roller in its lower end, and the curved beam 13, carrying the cutting-blade, formed with the curved slot 13ª, and pivoted at its front end on the crank-shaft, substantially as set forth.

2. In a cotton-chopper, the combination of a spring-actuated crank-shaft, means for turning the same, the recessed pillar 10, having the guide-roller in its lower end, and the curved beam 13, carrying the cutting-blade, formed with the curved slot 13ª, and pivoted at its front end on the crank-shaft, substantially as set forth.

3. The combination of the mutilated gear-wheel 3, secured to one of the drive-wheels, the crank-shaft 5, having the loose clutch-pinion 7 and the clutch-sleeve 8, the fixed hooked rods 17, having their free ends passing through the apertures 6ª of the crank-shaft, the spiral springs 18, arranged on said hooked rods, the recessed pillar 10, having the guide-roller 12 in its lower end, and the curved beam 13, carrying the cutting-blade, formed with the curved slot 13ª, and pivoted at its front end on the crank-shaft, substantially as set forth.

4. The combination of the mutilated gear-wheel 3, secured to one of the drive-wheels, the crank-shaft 5, having the loose clutch-pinion 7 and the clutch-collar 8, the fixed hooked rods 17, having their free ends passing through apertures 6ª of the crank-shaft, the spiral springs 18, arranged on said hooked rods, the recessed pillar 10, having the guide-roller in its lower end, the curved beam 13, carrying the cutting-blade, formed with the curved slot 13ª, and pivoted at its front end on the crank-shaft, and the spring 16, secured to the seat-frame and the rear upper end of the curved beam, substantially as set forth.

5. The combination, with the reciprocating beam 13, of the standard 14, secured thereto and hinged at its center to permit of side adjustment of its lower end, and the cutting-blade secured to said lower end, substantially as set forth.

6. The combination of the mutilated gear-wheel secured to one of the drive-wheels, the crank-shaft having the loose clutch-pinion 7 and the clutch-sleeve 8, the fixed hooked rods 17, having their free ends passing through apertures 6ª of the crank-shaft, the spiral springs 18, arranged on said hooked rods, the recessed pillar 10, having the guide-roller in its lower end, the curved beam 13, having the hinged standard carrying the cutting-blade, formed with the curved slot 13ª, and pivoted at its front end on the crank-shaft, the spring 16, the levers 20, pivoted to the pillar 10 and having the guide-roller 21 secured between their rear ends, and the side hoes 22, pivoted to the lower ends of levers 20 and connected by the transverse rod 23, having the spiral spring 24 mounted upon it, substantially as set forth.

In testimony whereof I affix my signature in presence of two witnesses.

JOHN J. BARRON.

Witnesses:
C. N. BAYLOR,
A. J. MACKY.